US011606180B2

(12) United States Patent
Zhou et al.

(10) Patent No.: US 11,606,180 B2
(45) Date of Patent: Mar. 14, 2023

(54) FEEDBACK MESSAGE CONTROL (71) Applicant: QUALCOMM Incorporated, San Diego, CA (US)

(72) Inventors: Yan Zhou, San Diego, CA (US); Xiaoxia Zhang, San Diego, CA (US); Tao Luo, San Diego, CA (US); Konstantinos Dimou, San Francisco, CA (US); Hamed Pezeshki, San Diego, CA (US); Seyed Ali Akbar Fakoorian, San Diego, CA (US); Mostafa Khoshnevisan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 153 days.

(21) Appl. No.: 16/888,084

(22) Filed: May 29, 2020

(65) Prior Publication Data
US 2020/0412509 A1 Dec. 31, 2020

Related U.S. Application Data (60) Provisional application No. 62/868,702, filed on Jun. 28, 2019.

(51) Int. Cl.
*H04L 5/00* (2006.01)
*H04W 72/0446* (2023.01)
(52) U.S. Cl.
CPC ....... *H04L 5/0055* (2013.01); *H04W 72/0446* (2013.01)
(58) Field of Classification Search
CPC . H04L 5/0055; H04L 1/1854; H04W 72/0446

USPC .......................................... 370/329
See application file for complete search history.

(56) References Cited

U.S. PATENT DOCUMENTS

2008/0253387 A1* 10/2008 Liang .................... H04L 1/1877
370/412
2020/0358587 A1* 11/2020 Wang ................ H04W 72/1268
2021/0329663 A1* 10/2021 Wong ................ H04W 72/1289

OTHER PUBLICATIONS

Panasonic, "Discussion on HARQ-ACK transmission due to BWP switching", R1-1802441, Feb. 26-Mar. 2, 2018. (From Applicant's IDS) (Year: 2018).*
Institute for Information Industry (III): "Enhancement on HARQ-ACK Feedback for URLLC", 3GPP Draft, 3GPP TSG RAN WG1 #96, R1-1902742 Enhancement on HARQ-ACK Feedback for URLLC, 3rd Generation Partnership Project (3GPP), Mobile Competence Centre 650, Route Des Lucioles, F-06921 Sophia-Antipolis Cedex, Fran, vol. RAN WG1, No. Athens, Greece, Feb. 25, 2019-Mar. 1, 2019, Feb. 15, 2019 (Feb. 15, 2019), XP051600437, pp 1-5.

(Continued)

*Primary Examiner* — Mang Hang Yeung
(74) *Attorney, Agent, or Firm* — Harrity & Harrity, LLP (57) ABSTRACT Various aspects of the present disclosure generally relate to wireless communication. In some aspects, a user equipment (UE) may determine that a current transmission cycle does not satisfy a feedback message transmission criterion for a feedback message to acknowledge whether a transmission was successfully received. The UE may perform a feedback response action on the feedback message based at least in part on determining that the current transmission cycle does not satisfy the feedback message transmission criterion. Numerous other aspects are provided.

30 Claims, 4 Drawing Sheets

(56) References Cited

OTHER PUBLICATIONS

Intel Corporation: "Some Remaining Details on DL/UL scheduling and HARQ Management", 3GPP Draft, 3GPP RAN WG1 Meeting #92bis, R1-1804733 Intel—SCHEDHARQ, 3rd Generation Partnership Project (3GPP), Mobile Competence Centre, 650, Route Des Lucioles, F-06921 Sophia-Antipolis Cedex, France, vol. RAN WG1, No. Sanya, P.R. China, Apr. 16, 2018-Apr. 20, 2018, Apr. 15, 2018 (Apr. 15, 2018), XP051427000, pp. 1-5.
International Search Report and Written Opinion—PCT/US2020/035538—ISAEPO—dated Sep. 16, 2020.
OPPO: "PUCCH Transmission on eLAA Carrier", 3GPP Draft, 3GPP TSG RAN WG1 Meeting #84, R1-160594, 3rd Generation Partnership Project (3GPP), Mobile Competence Centre, 650, Route Des Lucioles, F-06921 Sophia-Antipolis Cedex, France, vol. RAN WG1. No. St Julian's, Malta, Feb. 15, 2016-Feb. 19, 2016, Feb. 5, 2016 (Feb. 5, 2016) XP051064035, 3 Pages, Retrieved from the Internet: URL: http://www.3gpp.org/ftp/tsg_ran/WG1_RL1/TSGR1_84/Docs/, [retrieved on Feb. 5, 2016], The Whole Document.
Panasonic: "Discussion on HARQ-ACK Transmission Due to BWP Switching", 3GPP Draft, 3GPP TSG RAN WG1 Meeting #92, R1-1802441, 3rd Generation Partnership Project (3GPP), Mobile Competence Centre, 650, Route Des Lucioles, F-06921 Sophia-Antipolis Cedex, France, vol. RAN WG1, No. Athens, Greece, Feb. 26, 2018-Mar. 2, 2018, Feb. 15, 2018 (Feb. 15, 2018), XP051396874, pp. 1-2, Retrieved from the Internet: URL: http://www.3gpp.org/ftp/tsg%5Fran/WG1%5FRL1/TSGR1%5F92/Docs/, [retrieved on Feb. 15, 2018], the whole document.

* cited by examiner

FEEDBACK MESSAGE CONTROL

CROSS-REFERENCE TO RELATED APPLICATION

This Patent Application claims priority to U.S. Provisional Patent Application No. 62/868,702, filed on Jun. 28, 2019, entitled "FEEDBACK MESSAGE CONTROL," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for feedback message control.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include determining that a current transmission cycle does not satisfy a feedback message transmission criterion for a feedback message to acknowledge whether a transmission was successfully received; and performing a feedback response action on the feedback message based at least in part on determining that the current transmission cycle does not satisfy the feedback message transmission criterion.

In some aspects, an apparatus for wireless communication may include memory and one or more processor coupled to the memory and configured to determine that a current transmission cycle does not satisfy a feedback message transmission criterion for a feedback message to acknowledge whether a transmission was successfully received; and perform a feedback response action on the feedback message based at least in part on determining that the current transmission cycle does not satisfy the feedback message transmission criterion.

In some aspects, an apparatus for wireless communication may include means for determining that a current transmission cycle does not satisfy a feedback message transmission criterion for a feedback message to acknowledge whether a transmission was successfully received; and means for performing a feedback response action on the feedback message based at least in part on determining that the current transmission cycle does not satisfy the feedback message transmission criterion.

In some aspects, a non-transitory computer-readable medium storing computer executable code for wireless communication, may include code for determining that a current transmission cycle does not satisfy a feedback message transmission criterion for a feedback message to acknowledge whether a transmission was successfully received; and performing a feedback response action on the feedback message based at least in part on determining that the current transmission cycle does not satisfy the feedback message transmission criterion.

Aspects generally include a method, apparatus, system, computer program product, non-transitory computer-readable medium, user equipment, base station, wireless communication device, and/or processing system as substantially described herein with reference to and as illustrated by the accompanying drawings and/or specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
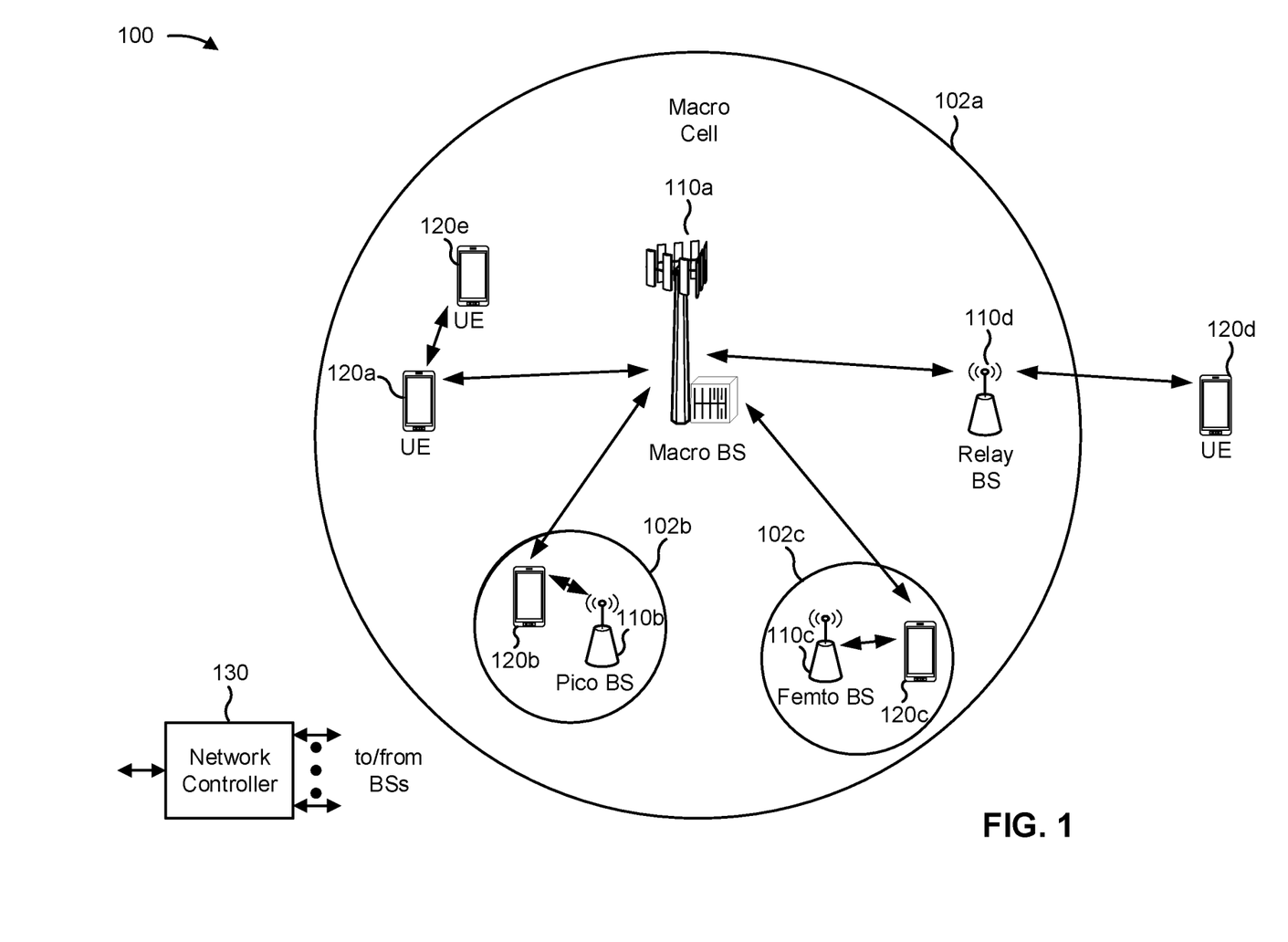
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. ABS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts)

whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
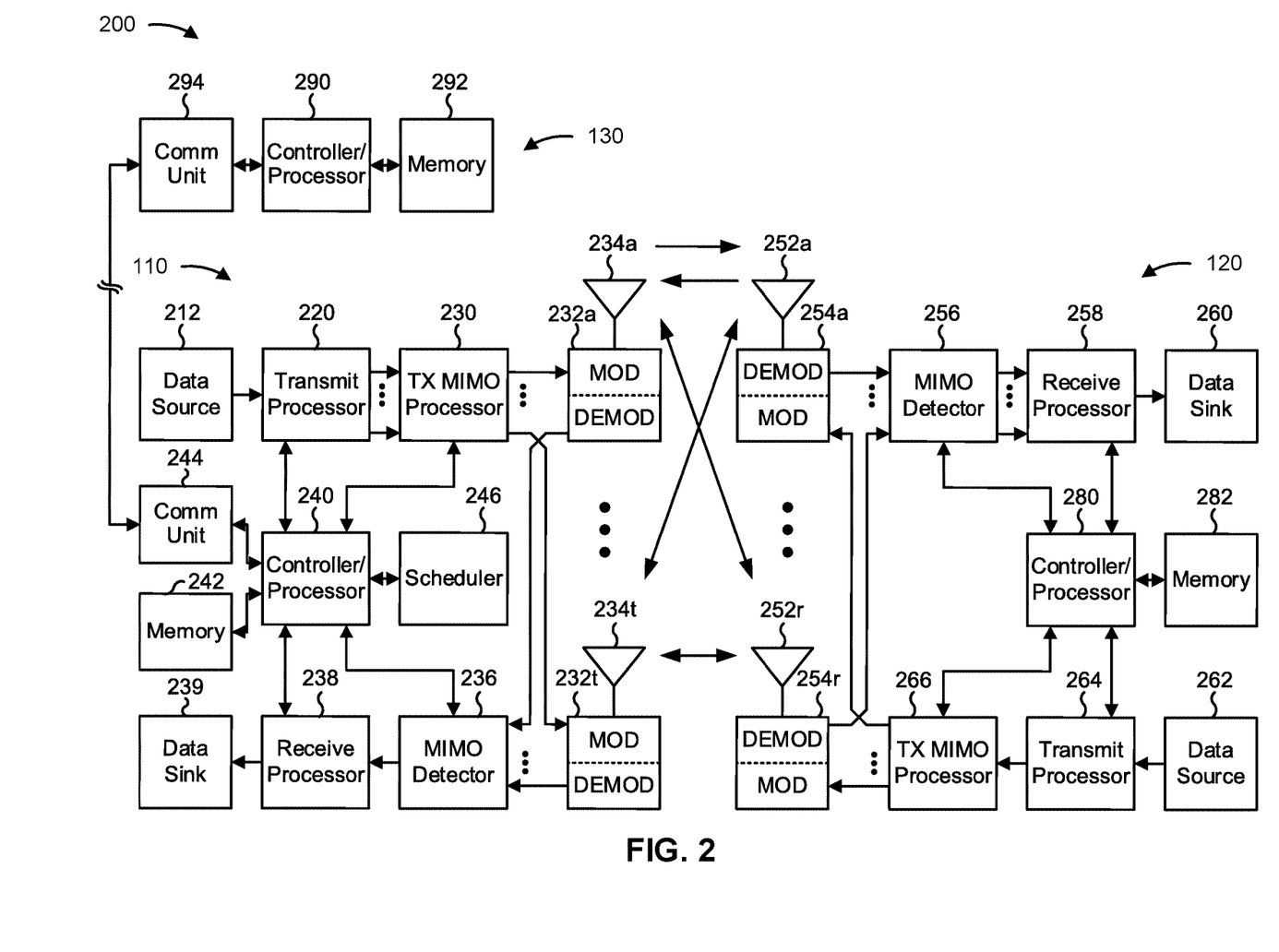
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with feedback message control, as described in more detail elsewhere herein. For example, controller/processor 240 of base station 110, controller/processor 280 of UE 120, and/or any other component(s) of FIG. 2 may perform or direct operations of, for example, process 400 of FIG. 4 and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 400 of FIG. 4 and/or other processes as described herein. A scheduler 246 may schedule UEs for data transmission on the downlink and/or uplink.

In some aspects, UE 120 may include means for determining that a current transmission cycle does not satisfy a feedback message transmission criterion for a feedback message to acknowledge whether a transmission was successfully received, means for performing a feedback response action on the feedback message based at least in part on determining that the current transmission cycle does not satisfy the feedback message transmission criterion, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

As indicated above, FIG. 2 is provided as an example. Other examples may differ from what is described with regard to FIG. 2.

In some communications systems, such as NR, a UE may transmit feedback messages to a BS to indicate whether a transmission is successfully received. For example, a BS may transmit a physical downlink shared channel (PDSCH) transmission to a UE, and the UE may transmit an acknowledgement (ACK) message via a physical uplink shared channel (PUSCH) to indicate successful receipt of the PDSCH transmission. Similarly, for a PDSCH and other periodic transmissions, when the UE does not receive the PDSCH transmission during a period of time for which the PDSCH transmission is scheduled, the UE may transmit a negative acknowledgement (NACK) message. The BS may retransmit the PDSCH based at least in part on receiving the NACK message. The UE may, for a retransmission of the PDSCH, transmit an ACK message to indicate successful receipt or a NACK message to trigger another retransmission. In this way, use of feedback messages reduces a likelihood that a UE is not able to communicate with a BS, by providing a mechanism for triggering retransmission.

However, in some cases, a time at which a feedback message is scheduled may be within a threshold of an end of a current transmission cycle. For example, when the UE sends a NACK message for a PDSCH and the BS retransmits the PDSCH, the retransmission of the PDSCH may be scheduled relatively close to an end of the current transmission cycle. As a result, an amount of time remaining in the current transmission cycle may not be enough for the UE to receive the retransmission of the PDSCH, process the retransmission of the PDSCH to confirm receipt, and transmit a feedback message (e.g., an ACK or NACK). The UE may be unable to transmit the feedback message in a subsequent transmission cycle, as resources of the subsequent transmission cycle may be reserved for feedback messages triggered by transmissions in the subsequent transmission cycle. In another example, the UE may not have resources scheduled in the current transmission cycle for transmitting a feedback message, even when the feedback message is triggered more than a threshold amount of time before an end of the current transmission cycle.

Some aspects described herein provide for feedback message control. For example, a UE may be configured to transmit a feedback message using resources of a subsequent transmission cycle, such as when the feedback message is triggered within a threshold period of time of a current transmission cycle, when the feedback message is triggered without a resource for transmitting the feedback message being scheduled, and/or the like. In this case, the BS may be configured to expect to receive a feedback message in a resource of a subsequent transmission cycle and may schedule resources in the subsequent transmission cycle to enable the UE to transmit the feedback message in the subsequent transmission cycle. Additionally, or alternatively, the UE may be configured to selectively drop the feedback message rather than attempting to transmit the feedback message in a subsequent transmission cycle. For example, when the UE determines that resources are not available for use in transmitting a feedback message, the UE may drop the feedback message rather than storing the feedback message for a threshold period of time until resources become available. In this way, the UE may enable greater flexibility for feedback messaging for periodic transmissions, thereby improving network utilization.

Figure 3:
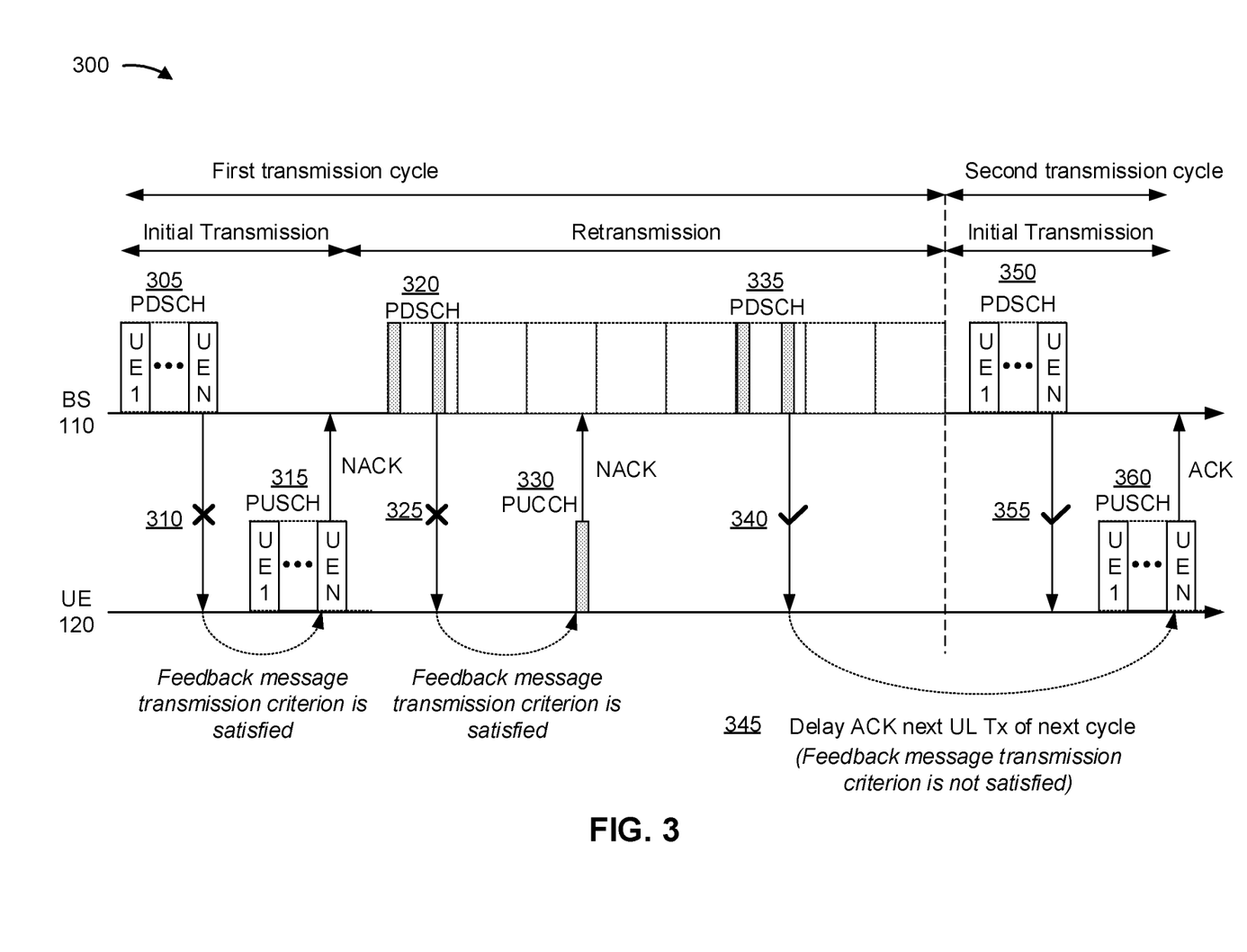
FIG. 3 is a diagram illustrating an example of feedback message control, in accordance with various aspects of the present disclosure.

FIG. 3 is a diagram illustrating an example 300 of feedback message delay, in accordance with various aspects of the present disclosure. As shown in FIG. 3, example 300 includes a BS 110 and a UE 120.

As further shown in FIG. 3, and by reference number 305, during a first transmission cycle, BS 110 may attempt to transmit a PDSCH to UE 120. For example, BS 110 may transmit PDSCH transmissions for a group of UEs 1 through N including UE 120. As shown by reference number 310, UE 120 may fail to receive a PDSCH transmission from BS 110 during a time period for which the PDSCH transmission is scheduled. For example, a beam direction of BS 110 may not be configured for a location of UE 120, which may result in UE 120 not receiving the PDSCH transmission.

In some aspects, UE 120 may determine that a feedback message transmission criterion is satisfied for transmitting a feedback message triggered by not receiving the PDSCH. For example, UE 120 may determine that the feedback message is triggered more than a threshold period of time before an end of the first transmission cycle and that an uplink resource is available for transmitting the feedback message in the first transmission cycle. In this case, UE 120 may transmit a NACK message using a PUSCH resource for UE 120 (e.g., of a group of PUSCH resources for a group of UEs 1 through N that includes UE 120), as shown by reference number 315.

In some aspects, UE 120 may receive signaling indicating use of the feedback message transmission criterion and/or a feedback response action associated therewith, as described in more detail herein. For example, BS 110 may transmit a downlink control information (DCI) message indicating that UE 120 is to delay a feedback message when the feedback message is triggered within a threshold amount of time of the end of a transmission cycle. Additionally, or alternatively, UE 120 may access a stored configuration indicating that UE 120 is to delay the feedback message when the feedback message is triggered within a threshold amount of time of the end of a transmission cycle. Additionally, or alternatively, UE 120 may receive a DCI or access a stored configuration indicating that UE 120 is to drop a feedback message if the feedback message transmission criterion is satisfied, as described in more detail herein.

As further shown in FIG. 3, and by reference number 320, based at least in part on receiving the NACK message, BS 110 may retransmit the PDSCH transmission to UE 120. For example, during a portion of the first transmission cycle allocated for PDSCH retransmission, BS 110 may attempt to retransmit the PDSCH to UEs that indicated a failure to receive the PDSCH. In this case, UE 120 may, again, fail to receive the PDSCH, as shown by reference number 325. For example, UE 120 may determine that a PDSCH transmission is not received during a time period for retransmission of the PDSCH, and may determine to transmit another feedback message to BS 110 to indicate a failure of the PDSCH retransmission. In this case, UE 120 may, again, determine that the feedback message transmission criterion is satisfied, and may transmit a NACK message using a physical uplink control channel (PUCCH) resource, as shown by reference number 330.

As further shown in FIG. 3, and by reference number 335, based at least in part on receiving another NACK message, BS 110 may, again, attempt to retransmit the PDSCH transmission to UE 120. For example, during the portion of the first cycle allocated for PDSCH retransmission, BS 110 may attempt to retransmit the PDSCH to each UE that, again, indicated a failure to receive the PDSCH. In this case, UE 120 may successfully receive the PDSCH, as shown by reference number 340. Based at least in part on successfully receiving the PDSCH, UE 120 may determine to transmit a feedback message (e.g., an ACK message) to BS 110 to indicate successful receipt of the PDSCH.

In this case, UE 120 may determine that the feedback message transmission criterion is not satisfied. For example, UE 120 may determine that the ACK message is triggered within a threshold amount of time of an end of the first cycle, which may result in the ACK message extending into the second cycle (e.g., as a result of processing and/or transmission delays). Additionally, or alternatively, UE 120 may determine that resources for transmitting the ACK message (e.g., PUSCH resources or PUCCH resources) are not allocated in a remainder of the first cycle.

In some aspects, UE 120 may determine to perform a feedback response action based at least in part on determining that the feedback message transmission criterion is not satisfied for the first transmission cycle. For example, as shown by reference number 345, UE 120 may delay the ACK message until an available uplink resource in a second transmission cycle after the first transmission cycle. In this case, UE 120 may store an indicator of the ACK message in a data structure to enable UE 120 to transmit the ACK message at a later time (e.g., using the available uplink resource of the second transmission cycle). In some aspects, UE 120 may use the feedback message for outer-loop link adaptation based at least in part on delaying the feedback message. For example, UE 120 may adapt a modulation, coding, and/or other parameter in connection with the feedback message based at least in part on delaying the feedback message. In some aspects, UE 120 may delay a feedback message for more than a single transmission cycle. For example, UE 120 may delay the ACK message until an available uplink resource, which may occur in a third transmission cycle, a fourth transmission cycle, and/or the like after the first transmission cycle.

In some aspects, UE 120 may perform a different feedback response action. For example, UE 120 may determine to drop the feedback message rather than storing and delaying the feedback message. In some aspects, UE 120 may determine to drop the feedback message based at least in part on a deadline criterion. For example, UE 120 may determine that an available uplink resource is not scheduled for a threshold amount of time, and may determine to drop the feedback message rather than store the feedback message for greater than the threshold amount of time. Additionally, or alternatively, UE 120 may determine to use a different frequency resource to transmit the feedback message. For example, UE 120 may receive an initial transmission on a first frequency FR1, and may frequency hop to a second frequency FR2 to transmit the feedback message, thereby increasing a likelihood of identifying an available uplink resource relative to remaining on a single frequency band.

In some aspects, UE 120 may determine to include the feedback message in another transmission that is to be transmitted using a subsequent uplink resource. For example, as shown by reference numbers 350, 355, and 360, UE 120 may receive a PDSCH transmission from BS 110 in the second transmission cycle and may have a PUSCH resource reserved for transmitting a feedback message for the PDSCH of the second transmission cycle. In this case, UE 120 may include the feedback message triggered by the second PDSCH retransmission in the first transmission cycle with the feedback message for the PDSCH of the second transmission cycle in a single PUSCH transmission using a PUSCH resource, as shown. In this way, UE 120 enables delayed transmission of a feedback message.

As indicated above, FIG. 3 is provided as an example. Other examples may differ from what is described with respect to FIG. 3.

Figure 4:
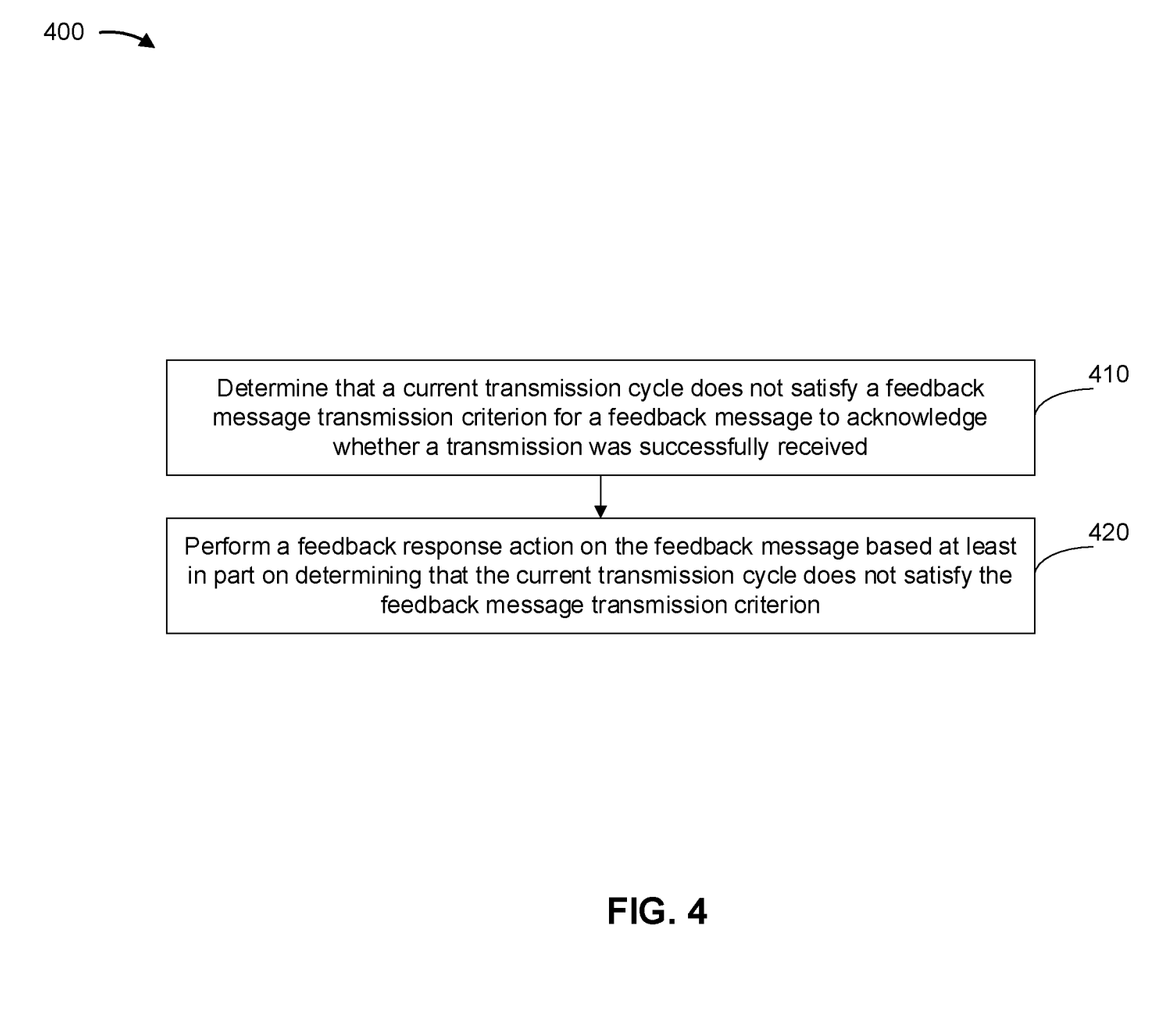
FIG. 4 is a diagram illustrating an example process performed, for example, by a user equipment, in accordance with various aspects of the present disclosure.

FIG. 4 is a diagram illustrating an example process 400 performed, for example, by a UE, in accordance with various aspects of the present disclosure. Example process 400 is an example where a UE (e.g., UE 120 and/or the like) performs operations associated with feedback message control.

As shown in FIG. 4, in some aspects, process 400 may include determining that a current transmission cycle does not satisfy a feedback message transmission criterion for a feedback message to acknowledge whether a transmission was successfully received (block 410). For example, the UE (e.g., using receive processor 258, transmit processor 264, controller/processor 280, memory 282, and/or the like) may determine that a current transmission cycle does not satisfy a feedback message transmission criterion for a feedback message to acknowledge whether a transmission was successfully received, as described above.

As further shown in FIG. 4, in some aspects, process 400 may include performing a feedback response action on the feedback message based at least in part on determining that the current transmission cycle does not satisfy the feedback message transmission criterion (block 420). For example, the UE (e.g., using receive processor 258, transmit processor 264, controller/processor 280, memory 282, and/or the like) may perform a feedback response action on the feedback message based at least in part on determining that the current transmission cycle does not satisfy the feedback message transmission criterion, as described above.

Process 400 may include additional aspects, such as any single aspect or any combination of aspects described below and/or in connection with one or more other processes described elsewhere herein.

In a first aspect, process 400 includes delaying transmission of the feedback message from the current transmission cycle to a subsequent transmission cycle based at least in part on determining that the current transmission cycle does not satisfy the feedback message transmission criterion, and transmitting the feedback message in the subsequent transmission cycle based at least in part on delaying the transmission of the feedback message from the current transmission cycle to the subsequent transmission cycle.

In a second aspect, alone or in combination with the first aspect, process 400 includes dropping the feedback message.

In a third aspect, alone or in combination with one or more of the first and second aspects, process 400 includes determining that an amount of remaining time in the current transmission cycle does not satisfy a threshold amount of time.

In a fourth aspect, alone or in combination with one or more of the first through third aspects, the threshold amount of time is based at least in part on a UE processing capability.

In a fifth aspect, alone or in combination with one or more of the first through fourth aspects, process 400 includes determining that an uplink resource for transmitting the feedback message is not available in the current transmission cycle.

In a sixth aspect, alone or in combination with one or more of the first through fifth aspects, the feedback message is an acknowledgement message or a negative acknowledgement message.

In a seventh aspect, alone or in combination with one or more of the first through sixth aspects, process 400 includes receiving an indicator from a base station instructing the UE to perform the feedback response action.

In an eighth aspect, alone or in combination with one or more of the first through seventh aspects, process 400 includes determining that an uplink resource is not available for the feedback message within a threshold amount of time, and dropping the feedback message based at least in part on determining that the uplink resource is not available for the feedback message within the threshold amount of time.

In a ninth aspect, alone or in combination with one or more of the first through eighth aspects, process 400 includes transmitting the feedback message on a different frequency band than a frequency band for which the feedback message was scheduled, based at least in part on determining that the current transmission cycle does not satisfy the feedback message transmission criterion.

In a tenth aspect, alone or in combination with one or more of the first through ninth aspects, process 400 includes transmitting the feedback message on a channel determined based at least in part on a base station indication or a preconfigured rule.

In an eleventh aspect, alone or in combination with one or more of the first through tenth aspects, process 400 includes transmitting the feedback message to enable outer-loop link adaptation, and performing outer-loop link adaptation using a measurement related to the transmitting of the feedback message.

In a twelfth aspect, alone or in combination with one or more of the first through eleventh aspects, process 400 includes transmitting an inquiry message to request information identifying a data pattern.

In a thirteenth aspect, alone or in combination with one or more of the first through twelfth aspects, the data pattern includes at least one of a packet arrival period or a packet expiration period.

In a fourteenth aspect, alone or in combination with one or more of the first through thirteenth aspects, process 400 includes storing one or more packets for which the feedback message is delayed or dropped.

Although FIG. 4 shows example blocks of process 400, in some aspects, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
    determining that a current transmission cycle does not satisfy a feedback message transmission criterion for a feedback message to acknowledge whether a transmission was successfully received during a portion of the current transmission cycle allocated for retransmission of the transmission;
    delaying transmission of the feedback message from the current transmission cycle to a subsequent transmission cycle based at least in part on determining that the current transmission cycle does not satisfy the feedback message transmission criterion; and
    transmitting the feedback message in the subsequent transmission cycle based at least in part on delaying the transmission of the feedback message from the current transmission cycle to the subsequent transmission cycle,
        wherein the feedback message from the current transmission cycle is included with another feedback message of the subsequent transmission cycle in a single transmission.

2. The method of claim 1, wherein the determining comprises determining that an amount of remaining time in the current transmission cycle does not satisfy a threshold amount of time.

3. The method of claim 2, wherein the threshold amount of time is based at least in part on a UE processing capability.

4. The method of claim 1, wherein the determining comprises determining that an uplink resource for transmitting the feedback message is not available in the current transmission cycle.

5. The method of claim 1, wherein the feedback message is an acknowledgement message or a negative acknowledgement message.

6. The method of claim 1, further comprising receiving an indicator from a network node instructing the UE to transmit the feedback message in the subsequent transmission cycle.

7. The method of claim 1, wherein the transmitting comprises transmitting the feedback message on a different frequency band than a frequency band for which the feedback message was scheduled based at least in part on delaying the transmission of the feedback message from the current transmission cycle to the subsequent transmission cycle.

8. The method of claim 1, wherein the transmitting comprises transmitting the feedback message on a channel determined based at least in part on a network node indication or a preconfigured rule.

9. The method of claim 1, wherein the transmitting comprises transmitting the feedback message to enable outer-loop link adaptation; and
    performing outer-loop link adaptation using a measurement related to the transmitting of the feedback message.

10. The method of claim 1, wherein the transmitting comprises transmitting an inquiry message to request information identifying a data pattern.

11. The method of claim 10, wherein the data pattern includes at least one of a packet arrival period or a packet expiration period.

12. The method of claim 10, further comprising storing one or more packets for which the feedback message is delayed or dropped.

13. An apparatus for wireless communication, comprising:
    a memory; and
    one or more processors coupled to the memory and configured to:
        determine that a current transmission cycle does not satisfy a feedback message transmission criterion for a feedback message to acknowledge whether a transmission was successfully received during a portion of the current transmission cycle allocated for retransmission of the transmission;
        delay transmission of the feedback message from the current transmission cycle to a subsequent transmission cycle based at least in part on determining that the current transmission cycle does not satisfy the feedback message transmission criterion; and
        transmit the feedback message in the subsequent transmission cycle based at least in part on delaying the transmission of the feedback message from the current transmission cycle to the subsequent transmission cycle,
            wherein the feedback message from the current transmission cycle is included with another feedback message of the subsequent transmission cycle in a single transmission.

14. The apparatus of claim 13, wherein the one or more processors, when determining that the current transmission cycle does not satisfy the feedback message transmission criterion, are configured to determine that an amount of remaining time in the current transmission cycle does not satisfy a threshold amount of time.

15. The apparatus of claim 14, wherein the threshold amount of time is based at least in part on a UE processing capability.

16. The apparatus of claim 13, wherein the one or more processors, when determining that the current transmission cycle does not satisfy the feedback message transmission criterion, are configured to determine that an uplink resource for transmitting the feedback message is not available in the current transmission cycle.

17. The apparatus of claim 13, wherein the feedback message is an acknowledgement message or a negative acknowledgement message.

18. The apparatus of claim 13, wherein the one or more processors are further configured to receive an indicator from a network node instructing the apparatus to transmit the feedback message in the subsequent transmission cycle.

19. The apparatus of claim 13, wherein the one or more processors, when transmitting the feedback message, are configured to transmit the feedback message on a different frequency band than a frequency band for which the feedback message was scheduled based at least in part on delaying the transmission of the feedback message from the current transmission cycle to the subsequent transmission cycle.

20. The apparatus of claim 13, wherein the one or more processors, when transmitting the feedback message, are configured to transmit the feedback message on a channel determined based at least in part on a network node indication or a preconfigured rule.

21. The apparatus of claim 13, wherein the one or more processors, when transmitting the feedback message, are configured to transmit the feedback message to enable outer-loop link adaptation; and
perform outer-loop link adaptation using a measurement related to the transmitting of the feedback message.

22. The apparatus of claim 13, wherein the one or more processors, when transmitting the feedback message, are to transmit an inquiry message to request information identifying a data pattern.

23. A non-transitory computer-readable medium storing computer executable code for wireless communication, comprising code for:
determining that a current transmission cycle does not satisfy a feedback message transmission criterion for a feedback message to acknowledge whether a transmission was successfully received during a portion of the current transmission cycle allocated for retransmission of the transmission;
delaying transmission of the feedback message from the current transmission cycle to a subsequent transmission cycle based at least in part on determining that the current transmission cycle does not satisfy the feedback message transmission criterion; and
transmitting the feedback message in the subsequent transmission cycle based at least in part on delaying the transmission of the feedback message from the current transmission cycle to the subsequent transmission cycle,
wherein the feedback message from the current transmission cycle is included with another feedback message of the subsequent transmission cycle in a single transmission.

24. The non-transitory computer-readable medium of claim 23, wherein the determining comprises determining that an amount of remaining time in the current transmission cycle does not satisfy a threshold amount of time.

25. The non-transitory computer-readable medium of claim 23, wherein the determining comprises determining that an uplink resource for transmitting the feedback message is not available in the current transmission cycle.

26. The non-transitory computer-readable medium of claim 23, wherein the feedback message is an acknowledgement message or a negative acknowledgement message.

27. An apparatus for wireless communication, comprising:
means for determining that a current transmission cycle does not satisfy a feedback message transmission criterion for a feedback message to acknowledge whether a transmission was successfully received during a portion of the current transmission cycle allocated for retransmission of the transmission;
means for delaying transmission of the feedback message from the current transmission cycle to a subsequent transmission cycle based at least in part on determining that the current transmission cycle does not satisfy the feedback message transmission criterion; and
means for transmitting the feedback message in the subsequent transmission cycle based at least in part on delaying the transmission of the feedback message from the current transmission cycle to the subsequent transmission cycle,
wherein the feedback message from the current transmission cycle is included with another feedback message of the subsequent transmission cycle in a single transmission.

28. The apparatus of claim 27, wherein the means for determining comprises means for determining that an amount of remaining time in the current transmission cycle does not satisfy a threshold amount of time.

29. The apparatus of claim 27, wherein the means for determining comprises means for determining that an uplink resource for transmitting the feedback message is not available in the current transmission cycle.

30. The apparatus of claim 27, wherein the feedback message is an acknowledgement message or a negative acknowledgement message.

* * * * *